(12) United States Patent
Widerman

(10) Patent No.: US 6,370,810 B1
(45) Date of Patent: Apr. 16, 2002

(54) FISHING ROD HOLDER

(76) Inventor: Scott Widerman, 1917 E. Washington St., Orlando, FL (US) 32803

(*) Notice: Subject to any disclaimer, the term of this patent is extended or adjusted under 35 U.S.C. 154(b) by 0 days.

(21) Appl. No.: 09/650,380

(22) Filed: Aug. 29, 2000

(51) Int. Cl.$^7$ .............................. A01K 97/10; F16L 3/12
(52) U.S. Cl. ...................... 43/21.2; 43/54.1; 248/74.3; 248/205.3; 248/682; 24/16 PB
(58) Field of Search .................. 43/21.2, 54.1; 206/315.11; 248/205.3, 683, 74.1, 74.2, 74.3, 53, 65; 24/16 PB, 564

(56) References Cited

U.S. PATENT DOCUMENTS

| | | | |
|---|---|---|---|
| 2,340,713 A | * 2/1944 | Timmerman | 248/74.3 |
| 2,466,912 A | * 4/1949 | Rice | 248/74.3 |
| 2,555,073 A | 5/1951 | Zdankoski | 43/55 |
| 2,596,403 A | * 5/1952 | Hoffman | 43/21.2 |
| 3,095,663 A | 7/1963 | Miller | 43/21.2 |
| 3,555,719 A | 1/1971 | Butler | 43/54.1 |
| 3,987,574 A | 10/1976 | Pennio | 43/26 |
| 4,014,128 A | 3/1977 | Hrdlicka | 43/21.2 |
| 4,095,364 A | 6/1978 | Prine | 43/21.2 |
| 4,106,811 A | * 8/1978 | Hernandez | 43/21.2 |
| 4,317,262 A | * 3/1982 | Wells, Jr. | 24/16 PB |
| 4,353,182 A | 10/1982 | Junkas et al. | 43/54.1 |
| 4,389,034 A | * 6/1983 | Suttles | 248/205.3 |
| 4,393,998 A | * 7/1983 | Allen et al. | 248/74.1 |
| 4,439,896 A | * 4/1984 | Matsui | 24/16 PB |
| 4,447,934 A | * 5/1984 | Anscher | 24/16 PB |
| 4,609,171 A | * 9/1986 | Matsui | 248/74.3 |
| 4,747,490 A | * 5/1988 | Smith | 206/315.11 |
| 4,841,660 A | 6/1989 | James | 43/21.2 |
| 4,856,221 A | * 8/1989 | Thompson | 43/21.2 |
| 4,897,952 A | * 2/1990 | Hawie | 43/21.2 |
| 5,009,376 A | * 4/1991 | Usui | 248/74.1 |
| 5,184,794 A | * 2/1993 | Saito | 248/74.1 |
| 5,209,009 A | 5/1993 | Fast | 43/54.1 |
| 5,230,489 A | * 7/1993 | White et al. | 248/74.2 |
| 5,305,542 A | * 4/1994 | Phelps | 43/21.2 |
| 5,305,978 A | * 4/1994 | Current | 248/74.3 |
| 5,347,746 A | 9/1994 | Letson | 43/57.1 |
| 5,873,522 A | * 2/1999 | Roberts | 248/74.1 |
| 5,876,003 A | * 3/1999 | Waagenaar | 248/205.3 |
| 5,938,023 A | * 8/1999 | Herron et al. | 43/54.1 |
| 6,079,674 A | * 6/2000 | Snyder | 248/74.3 |
| 6,254,042 B1 | * 7/2001 | Kogure et al. | 248/74.3 |
| 6,282,756 B1 | * 9/2001 | van Waldraven | 24/19 |

* cited by examiner

Primary Examiner—Darren W. Ark
(74) Attorney, Agent, or Firm—Charles J. Prescott

(57) ABSTRACT

A fishing rod holding device adhesively connectable to support surfaces such as an upright wall, a horizontal surface, and a portable fishing tackle box and a pair of the devices in combination with a fishing tackle box. The preferred device includes a generally flat base having first and second surfaces and structured to be mounted onto the support surface and an adhesive layer securely attached to the base first surface configured to securely attach the base onto the support surface. A resilient split annular-shaped band is formed as a unit with, or attached to, and extends from the base second surface. A first end of a first portion of the band is releasably engageable with a second end of a second portion to form a substantially closed ring by resilient closure movement of the first and second portions together. A resiliently compressible foam layer is conformingly attached to a substantial portion of an inner surface of the band. The band and the foam layer are cooperatively structured in thickness and resilient flexibility to allow the first and second portions to be resiliently spread apart sufficiently for a fishing rod to be inserted between the first and second ends and between spaced ends of the foam layer and, thereafter, to be releasably engaged together to secure the fishing rod from substantial movement therewithin by gripping engagement of the foam layer therearound. Two spaced apart aligned devices are preferred to properly hold a fishing rod securely enough so that the fishing tackle box, with fishing pole attached within the devices, may be carried.

4 Claims, 2 Drawing Sheets

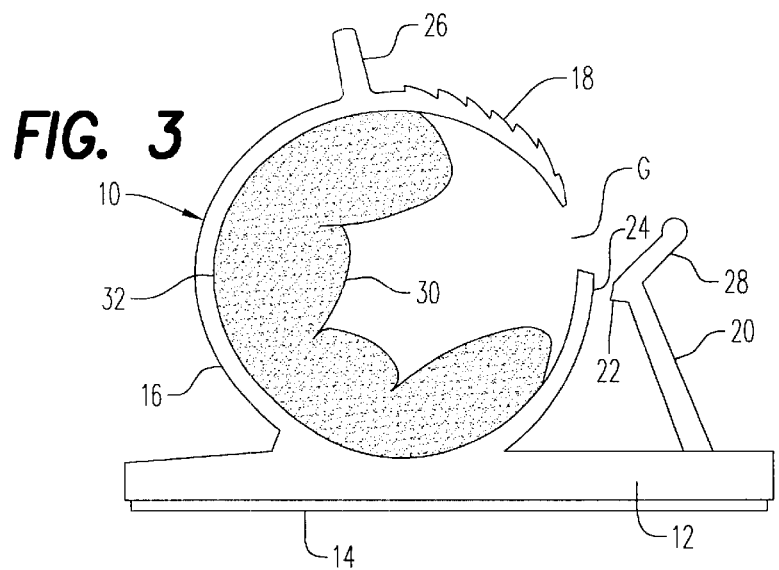
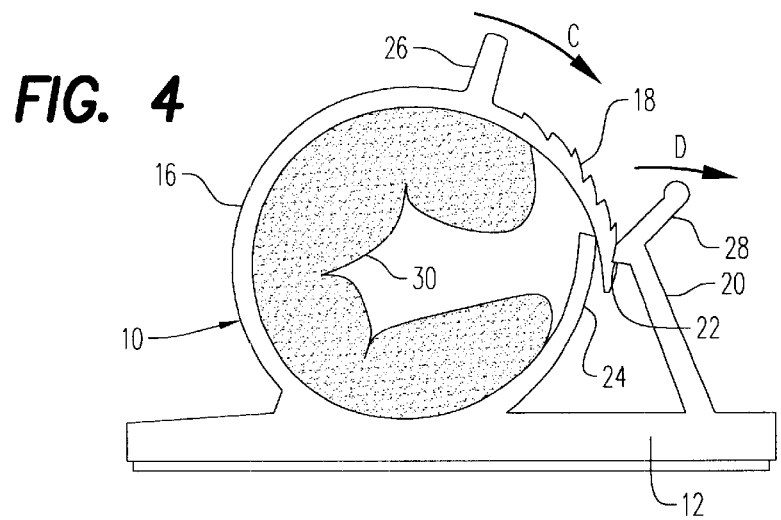
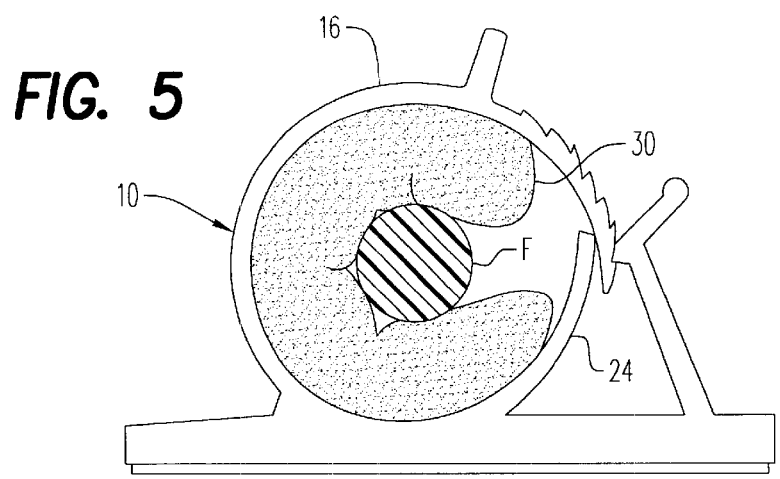

FISHING ROD HOLDER

BACKGROUND OF THE INVENTION

1. Scope of Invention

This invention relates generally to fishing gear, and more particularly to a fishing rod holding device for holding and carrying a fishing rod in close proximity to one surface of a portable fishing tackle box.

2. Prior Art

In transporting fishing gear, the fishing tackle box is provided with a carrying handle which occupies one hand during its transport, while one or more fishing poles are carried in the other hand. This two-handed carry is awkward and potentially damaging to equipment and others nearby.

Several prior U.S. patents are known to applicant which teach holding a fishing rod onto a tackle box in various orientations as follows:

| | |
|---|---|
| U.S. Pat. No. 3,555,719 | Butler |
| U.S. Pat. No. 5,209,009 | Fast |
| U.S. Pat. No. 4,014,128 | Hrdlicka |
| U.S. Pat. No. 4,841,660 | James |
| U.S. Pat. No. 3,095,663 | Miller |
| U.S. Pat. No. 4,095,364 | Prine |
| U.S. Pat. No. 2,555,073 | Zdankoski |

These prior art devices are intended to hold a fishing rod in a position for use which is particularly directed to a specific orientation during the process of actually fishing. The present invention, on the other hand, is primarily focused toward the secure storage and transport of the fishing rod attached to the fishing tackle box in an effective way so as to avoid any substantial movement, rattling or shaking of the fishing rod in its stored and carried position.

In U.S. Pat. No. 4,353,182, Junkas teaches a fishing box which is designed to carry anything and everything a fisherman might possibly want or need during a fishing trip and also provides spring clips attached to the pivotal arm of the fishing box which cooperate to secure a pair of fishing rods therebetween.

In U.S. Pat. No. 3,987,574, Pennino teaches a fishing rod and tackle carrier providing a tubular container and having a plurality of spaced snap ring pairs, each pair designed to receive and hold a fishing rod in lengthwise orientation to the container.

Yet another fishing tackle box including accessory holders thereatop for loosely receiving a fishing rod is taught by Letson in U.S. Pat. No. 5,347,746. Although conceptually similar to that of the present invention, little or no concern has been paid to the likelihood that the fishing rod will rattle and slide longitudinally with respect to the fishing rod within these rigid brackets provided by Letson.

The present invention provides a fishing rod holding device attachable to, or connected in combination with, one exterior surface of a fishing tackle box or other support surface, each device squeezingly engaging around the fishing rod to prevent substantial movement laterally or longitudinally of the rod, including even rattling movement, without concern for marring or scratching potentially expensive fishing rods.

BRIEF SUMMARY OF THE INVENTION

This invention is directed to a fishing rod holding device adhesively connectable to support surfaces such as an upright wall, a horizontal surface, and a portable fishing tackle box and a pair of the devices in combination with a fishing tackle box. The preferred device includes a generally flat base having first and second surfaces and structured to be mounted onto the support surface and an adhesive layer securely attached to the base first surface configured to securely attach the base onto the support surface. A resilient split annular-shaped band is formed as a unit with, or attached to, and extends from the base second surface. A first end of a first portion of the band is releasably engageable with a second end of a second portion to form a substantially closed ring by resilient closure movement of the first and second portions together. A resiliently compressible foam layer is conformingly attached to a substantial portion of an inner surface of the band. The band and the foam layer are cooperatively structured in thickness and resilient flexibility to allow the first and second portions to be resiliently spread apart sufficiently for a fishing rod to be inserted between the first and second ends and between spaced ends of the foam layer and, thereafter, to be releasably engaged together to secure the fishing rod from substantial movement therewithin by gripping engagement of the foam layer therearound. Two spaced apart aligned devices are preferred to properly hold a fishing rod securely enough so that the fishing tackle box, with fishing pole attached within the devices, may be carried.

It is therefore an object of this invention to provide a fishing rod holding device which is securely attachable to a support surface such as an upright wall, horizontal surface or a portable fishing tackle box.

It is yet another object of this invention to provide a fishing rod holding device which, when properly attached to a support surface in an aligned pair thereof, will securely retain a fishing rod therewithin without concern for marring of the fishing rod itself.

Yet another object of this invention is to provide a combination fishing tackle box and a pair of spaced fishing rod holding devices connected to an outer surface of the tackle box which will securely retain a fishing rod in a stored position without substantial movement or rattling during transport of the fishing tackle box.

Still another of this invention is to provide a fishing rod holding device which is attachable as an aligned pair to any support surface such as an upright wall, a horizontal surface or appropriate surfaces of a vehicle or boat for securely storing fishing rods with the elimination of any rattling or lateral or longitudinal movement of the fishing rod therewithin.

In accordance with these and other objects which will become apparent hereinafter, the instant invention will now be described with reference to the accompanying drawings.

BRIEF DESCRIPTION OF THE DRAWINGS

FIG. 3 is a side elevation view of the device of FIG. 2 in the open, relaxed position.

FIG. 4 is a view similar to FIG. 3 showing the closure movement to effect releasable engagement of the split annular band.

FIG. 5 is a view similar to FIG. 4 showing the secured positioning of a fishing rod held within the device.

DETAILED DESCRIPTION OF THE INVENTION

Figure 1:
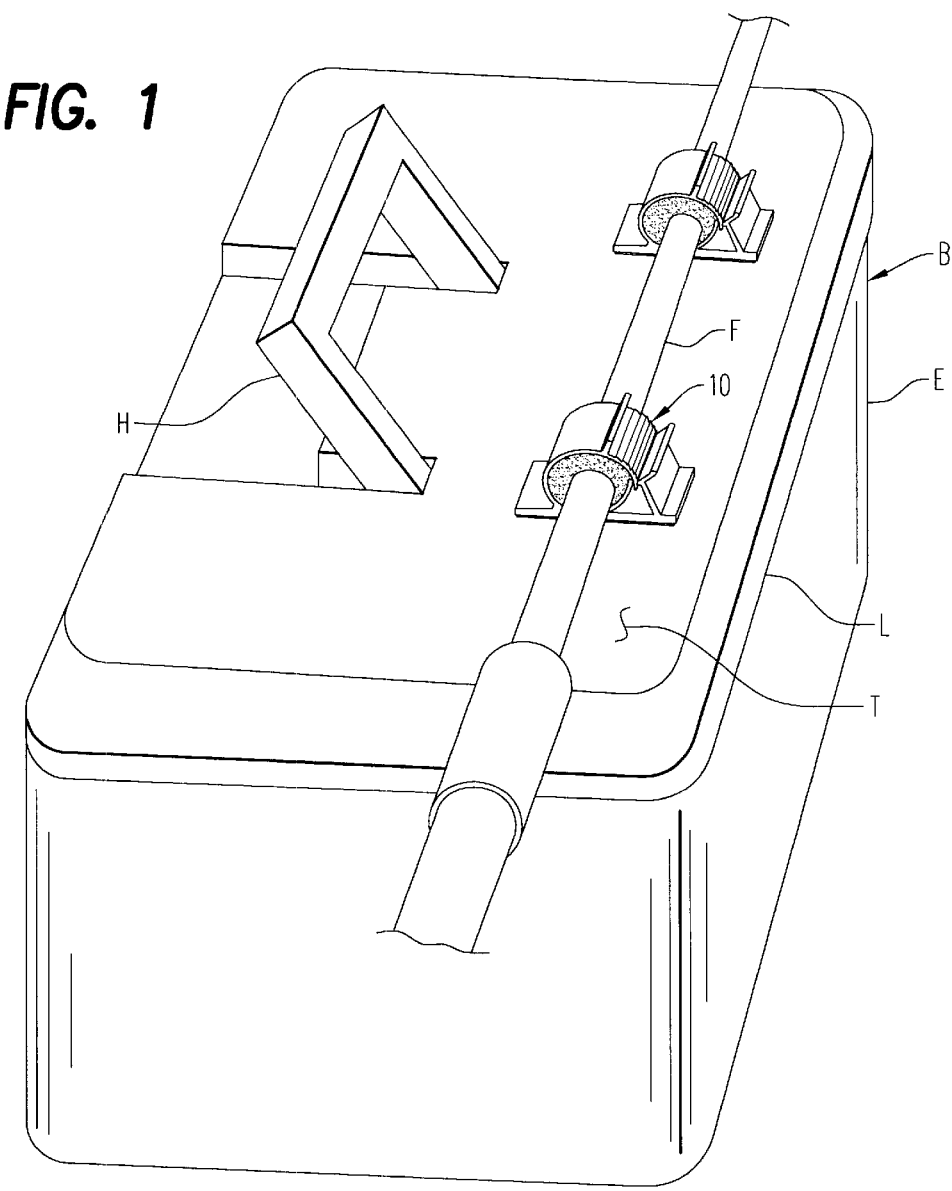
FIG. 1 is a perspective view of one embodiment of the invention.

Referring now to the drawings, one aspect of the invention is there shown as a combination of the fishing rod holding device shown at numeral 10 and a fishing tackle box shown generally at letter B. The fishing rod holding device 10 is shown attached or permanently connected atop the openable lid L of the fishing tackle box B, the lid L enclosing or covering an interior volume defined by the bottom portion E of the tackle box B. The lid L also includes a carrying handle H to transporting the tackle box B. A pair of the fishing rod holding devices 10 is positioned on the exterior surface T of lid L in spaced apart aligned fashion so that a fishing rod F may be stored and secured therewith as will be described more fully here below.

The fishing rod holding device 10, as best seen in all figures, is formed as a unit, preferably by extrusion of plastic material as the cross section is uniform. The device 10 includes a flat rectangular base 12 and a resilient split annular-shaped band extending perpendicularly from one surface of the base 12. The split band is formed a two band portions 16 and 24 which, in the relaxed, open configuration as seen in FIG. 3, define a gap G therebetween. A rectangular compressible foam layer 30 is attached to and extends over a substantial length of the inner surfaces of band portions 24 and 16 as shown. The foam layer 30 is formed of a flat rectangular segment of foam and rigidly adhered into the position shown where it permanently remains during use of the device 10.

Locking grooves 18 extend transversely across the end portion of band portion 16 which are configured to be interconnected within a sharp locking edge 22 of a locking arm 20 which is also integrally formed as a unit with base 12 as shown. To close the gap G and releasably lock the two band portions 24 and 16 together to form a substantially continuous annular band, a tab 26 is pushed in the direction of arrow C to resiliently flex or deform band portion 16 so that one of the locking grooves 18 mateably engages with locking edge 22. Locking arm 20 may be moved by tab 28 in the direction of arrow D in FIG. 4 to facilitate this locking engagement and also to release the locking edge 22 from its locking engagement with the grooves 18 to effect releasable disengagement therebetween when desired.

As best seen in FIG. 5, the fishing rod F, there shown in cross section, is fully secured by the compressive gripping action of the foam layer 30. To effect this installation, the gap G is made sufficiently wide by movement of tab 26 so that the fishing rod F may be inserted into the central portion of the arcuately deformed foam layer 30. Thereafter, tab 26 is moved in the direction of arrow C to lockingly engage one of the grooves 18 with the locking edge 22. Tightness is adjustable as desired so as to achieve the desired gripping compression of the foam layer 30 around a substantial portion of the circumference of the fishing rod F as shown.

When two of the fishing rod holding devices 10 are attached in spaced aligned relationship atop, for example, the upper surface T of the lid L as shown in FIG. 1, the fishing box B may be carried by its handle H without concern for any movement either laterally or longitudinally of the fishing rod F with respect to the devices 10 or the box B. No scratching or marring of the fishing rod can occur. Again, to remove the fishing rod F, the release tab 28 is moved in the direction of arrow C in FIG. 4 to effect disengagement of the locking edge 22 from the grooves 18, after which tab 26 is moved in the opposite direction from arrow C to reestablish a gap G sufficiently large for fishing rod F removal.

The preferred source for the extruded plastic device 10 absent the foam layer 30, but including the foam layer 14 is available from RICHCO having its U.S. corporate headquarters located in Chicago, Ill. The particular clamp utilized carries their p/n EAKKL-8710, referred to as an extruded adjustable Kwik Klip. The double-sided adhesive tape 14 utilized in this invention is available from the 3M Corporation described as 4416W, a double coated vinyl foam tape formed of closed-cell polyvinylchloride foam. The resilient compressible foam layer 30 is sourced from Armstrong referred to as TUBOLIT polyethylene with PSA adhesive at the mating surface 32 with the inner surface of the band portions 16 and 24.

Figure 2:
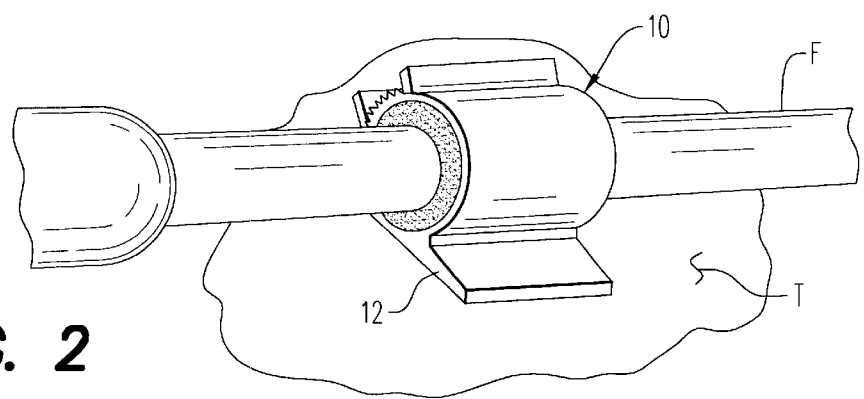
FIG. 2 is a perspective view of the fishing rod holding device of FIG. 1.

The preferred embodiment of the invention is in the form of the fishing rod holding device itself having the above-described adhesive layer 14 attached thereto which has been shown, when attached to an exterior surface of a fishing tackle box B in pairs, to be an extremely marketable and effective means for its commercialization. However, it is also envisioned within the scope of this invention as seen in FIGS. 1 and 2, to provide an entire fishing tackle box B of the type hereinabove described which incorporates the device 10 thereon marketed as a combination product. This alternate combination of tackle box B and an aligned pair of fishing rod holding devices 10 is envisioned to be marketed with the fishing rod holding device 10 structured and attached to an exterior surface of the fishing tackle box B as above described. Should economic factors be sufficiently positive, an entirely new fishing tackle box lid is also envisioned to be manufactured incorporating the molding of these devices 10 directly thereto as a unit.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A fishing rod holding device adhesively connectable to a portable fishing tackle box comprising:

a generally flat base having first and second surfaces and structured to be mounted onto a generally flat support surface of the fishing tackle box;

an adhesive layer securely attached to said base first surface configured to securely attach said base onto the support surface;

a resilient split annular-shaped band attached to and extending from said base second surface, a first end of a first portion of said band repeatedly lockably and releasably engageable with a second end of a second portion of said band to form a substantially closed ring of adjustable circumference by resilient closure movement of said first and second portions together each time the fishing rod is secured into said holding device;

a resiliently compressible foam layer formed as a flat rectangular sheet of uniform rectangular cross section, one surface of said sheet adhesively attached to a substantial portion of an inner surface, but not to said first and second ends of, said band; and said foam layer having a thickness in a range of diameters of fishing rods whereby, when said first and second portions are resiliently spread apart sufficiently for one of the fishing rods to be inserted between said first and second ends and between spaced ends of said foam layer, and thereafter, releasably engaged together, the fishing rod is secured from substantial axial movement within said device by tight gripping engagement of said foam layer around the fishing rod.

2. A fishing rod holding device adhesively connectable to support surfaces such as an upright wall, a horizontal surface, and a portable fishing tackle box consisting essentially of:
- a generally flat base having first and second surfaces and structured to be mounted onto the support surface;
- an adhesive layer securely attached to said base first surface configured to securely attach said base onto the support surface;
- a resilient split annular-shaped band attached to and extending from said base second surface, a first end of a first portion of said band lockable and releasably engageable with a second end of a second portion of said band to form a substantially closed ring by resilient closure movement of said first and second portions together;
- a resiliently compressible foam layer having one surface thereof permanently adhesively attached to a substantial portion of an arcuate inner surface of said band; and
- said band and said foam layer cooperatively structured in thickness and resilient flexibility to allow said first and second portions to be resiliently spread apart sufficiently for a fishing rod to be inserted between said first and second ends and between spaced ends of said foam layer and, thereafter, to be releasably engaged together to secure the fishing rod from substantial axial movement by tight gripping engagement of said foam layer when highly compressed around the fishing rod.

3. A fishing rod holding device adhesively connectable to a portable fishing tackle box consisting essentially of:
- a generally flat base having first and second surfaces and structured to be mounted onto a generally flat support surface of the fishing tackle box;
- an adhesive layer securely attached to said base first surface configured to securely attach said base onto the support surface;
- a resilient split annular-shaped band attached to and extending from said base second surface, a first end of a first portion of said band repeatedly lockably and releasably engageable with a second end of a second portion of said band to form a substantially closed ring by resilient closure movement of said first and second portions together each time the fishing rod is secured into said holding device;
- a resiliently compressible foam layer formed as a flat rectangular sheet of uniform rectangular cross section, one surface of said sheet adhesively attached to a substantial portion of an inner surface, but not to said first and second ends of, said band; and
- said band and said foam layer cooperatively structured in thickness and resilient flexibility to allow said first and second portions to be resiliently spread apart sufficiently for a fishing rod to be inserted between said first and second ends and between spaced ends of said foam layer and, thereafter, to be releasably engaged together to secure the fishing rod from substantial axial movement by gripping engagement of said foam layer when highly compressed around the fishing rod.

4. In combination, a portable fishing tackle box and two fishing rod holding devices, said fishing tackle box comprising:
- a bottom portion having front, side, back and bottom walls each having an exterior surface defining an interior space open at generally coplanar margins thereof;
- a lid having an exterior surface and pivotally connected along one edge thereof to an upper margin of said back wall and sized to fit over and enclose said interior space;
- each said device consisting essentially of:
  - a generally flat base having first and second surfaces, the first surface being connected to one of the exterior surfaces;
  - a resilient split annular-shaped band attached to and extending from said base second surface, a first end of a first portion of said band lockingly and releasably engageable with a second end of a second portion of said band to form a substantially closed ring by resilient closure movement of said first and second portions together;
  - a resiliently compressible foam layer conformingly attached within said band to a substantial portion of an inner surface of said band;
  - said two fishing rod holding devices positioned in spaced aligned relation on one of the exterior surfaces of said portable fishing tackle box; and
  - said band and said foam layer cooperatively structured in thickness and resilient flexibility to allow said first and second portions to be resiliently spread apart sufficiently for a fishing rod to be inserted between said first and second ends and between spaced ends of said foam layer and, thereafter, to be releasably engaged together to secure the fishing rod from substantial lateral movement by firm gripping engagement of said foam layer therearound.

* * * * *